US007653018B2

(12) United States Patent
Regan et al.

(10) Patent No.: US 7,653,018 B2
(45) Date of Patent: Jan. 26, 2010

(54) DIFFERENTIAL UPDATE FOR DATA BROADCASTING

(75) Inventors: Tim Regan, Cambridge (GB); Pablo Rodriguez, Cambridge (GB); Ken Wood, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 911 days.

(21) Appl. No.: 10/899,990

(22) Filed: Jul. 27, 2004

(65) Prior Publication Data

US 2006/0023730 A1 Feb. 2, 2006

(51) Int. Cl.
*H04H 20/71* (2008.01)
*H04L 12/26* (2006.01)
*H04L 12/28* (2006.01)
*G06F 17/30* (2006.01)

(52) U.S. Cl. ....................... 370/312; 370/252; 370/270; 370/390; 707/203

(58) Field of Classification Search ................. 370/432, 370/203, 270, 317, 390; 709/244; 707/203
See application file for complete search history.

(56) References Cited

U.S. PATENT DOCUMENTS 6,324,544 B1 * 11/2001 Alam et al. ................. 707/201
6,463,265 B1 10/2002 Cohen et al.
6,560,777 B2 5/2003 Blackketter et al.
6,711,572 B2 * 3/2004 Zakharov et al. .............. 707/10
6,760,840 B1 * 7/2004 Shimbo et al. .............. 713/165
6,996,584 B2 * 2/2006 White et al. ................ 707/203
7,039,656 B1 * 5/2006 Tsai et al. .................... 707/201
7,281,024 B1 * 10/2007 Banerjee et al. ............. 707/204
7,290,018 B2 * 10/2007 Muecklich et al. .......... 707/204
7,320,010 B2 * 1/2008 Peng .......................... 707/200
2001/0007103 A1 * 7/2001 Breiter et al. .................. 707/1
2003/0028901 A1 2/2003 Shae et al.
2003/0055949 A1 * 3/2003 Coulombe et al. .......... 709/224
2003/0114136 A1 6/2003 Dietz et al.
2003/0163528 A1 8/2003 Banerjee et al.
2004/0054764 A1 * 3/2004 Aderton et al. ............. 709/223
2004/0267741 A1 * 12/2004 Galindo-Legaria et al. ...... 707/5
2005/0080823 A1 * 4/2005 Collins ....................... 707/200
2005/0125525 A1 * 6/2005 Zhou et al. .................. 709/223
2005/0135429 A1 * 6/2005 Bingham et al. ............ 370/503
2005/0229093 A1 * 10/2005 Campbell et al. ........... 715/500
2007/0180075 A1 * 8/2007 Chasman et al. ............ 709/223
2008/0037593 A1 * 2/2008 Friedman et al. ............ 370/503

* cited by examiner

*Primary Examiner*—Chi H Pham
*Assistant Examiner*—Warner Wong

(57) ABSTRACT

Systems and methods for differential updates in a data broadcasting environment are disclosed. A data broadcasting system receives profile information representative of information desired by subscribers to the data broadcasting system. Broadcast content may be adjusted in response to changes in the aggregate status of document versions stored on subscriber units.

19 Claims, 5 Drawing Sheets

300

| | | |
|---|---|---|
| Subscriber ID: ABC123 302 | | |
| Sports 310 | Soccer 312<br>Baseball 314 | 05:00:00 316<br>05:05:00 318 |
| Finance 320 | Stock Quotes 322<br>Mortgage Rates 324 | 10.1.7 326<br>10.2.5 328 |
| Business 330 | Weekly Update 332 | 06.01.2004 334 |
| Entertainment 340 | New Hits 342<br>Fallen Stars 344 | 1.5.1 346<br>1.6.2 348 |

Fig. 3

400

| Document Number 410 | Content 420 | Broadcast Periodicity 430 | Start Time 430 | Stop Time 450 |
|---|---|---|---|---|
| Document 1 | Soccer | 60 Minutes | 06:00:00 | 06:05:00 |
| Document 2 | Baseball | 20 Minutes | 06:05:00 | 06:07:00 |
| Document 3 | Fallen Stars | 300 Minutes | 12:25:00 | 12:35:00 |
| Document 4 | Weekly Update | 600 Minutes | 10:00:00 | 11:00:00 |
| Document 5 | Mortgage Rates | 60 Minutes | 08:35:00 | 08:55:00 |
| • | | | | |
| • | | | | |
| Document n | New Hits | 300 Minutes | 12:15:00 | 12:25:00 |

Fig. 4

DIFFERENTIAL UPDATE FOR DATA BROADCASTING

TECHNICAL FIELD

The described subject matter relates to electronic communication, and more particularly to differential updates for data broadcasting.

BACKGROUND

The term "data broadcasting" (also referred to sometimes as "datacasting") refers generally to the widespread distribution of the same content to a plurality (typically a large number) of subscriber units. Advances in electronic computing and communication technology, particularly wireless communication technology, have enabled data broadcasting techniques to be applied in wireless communication markets to service mobile subscriber units. Examples of such technologies include Digital Audio Broadcast, or Digital Video Broadcast. The content is broadcast to multiple clients simultaneously using the same physical channel (e.g, the same time slot or frequency), thereby efficiently using network resources. Regardless of the number of subscriber units, the server only sends one copy of the content, thus minimizing the impact in the server's capacity.

Conventional data broadcasting systems are push systems, which do not permit users to specify the content that is pushed through the broadcast communication channel. Rather, data broadcasting systems pre-select a number of documents to be broadcasted. Documents are placed in a queue, sometimes referred to as a "carousel" and broadcast sequentially in a rotating manner.

Bandwidth limitations in the wireless communication channel(s) available to data broadcasting services establish a real physical limit to the amount of content that a data broadcasting service can distribute in a given time period. Improved content distribution schemes would enable data broadcasting services to manage limited bandwidth more effectively and to provide improved services to customers.

SUMMARY

Implementations described and claimed herein provide systems and methods for performing differential updates for data broadcasting. In exemplary implementations one or more computing devices associated with a data broadcasting system maintains profile data records for subscribers to the data broadcasting system. The allocation of content in the broadcast carousel for a broadcast region may be adjusted in response to version information for specific documents among subscribers in the broadcast region.

BRIEF DESCRIPTION OF THE DRAWINGS

FIG. 3 is an illustration of an exemplary data structure for holding subscriber profile information.

FIG. 4 is an illustration of a data structure representing a data broadcasting carousel.

DETAILED DESCRIPTION

Exemplary implementations of methods, systems, and computer program products for intelligent data broadcasting are described herein. In certain implementations, techniques can utilize subscriber preference and/or location information to adjust the data broadcast content within a specific data broadcast region. In certain implementations, a network management system can adjust data broadcast content on one or more data broadcasting regions in a dynamic fashion in response to changes in the distribution of subscriber preferences in the region.

Exemplary Operating Environment

Figure 1:
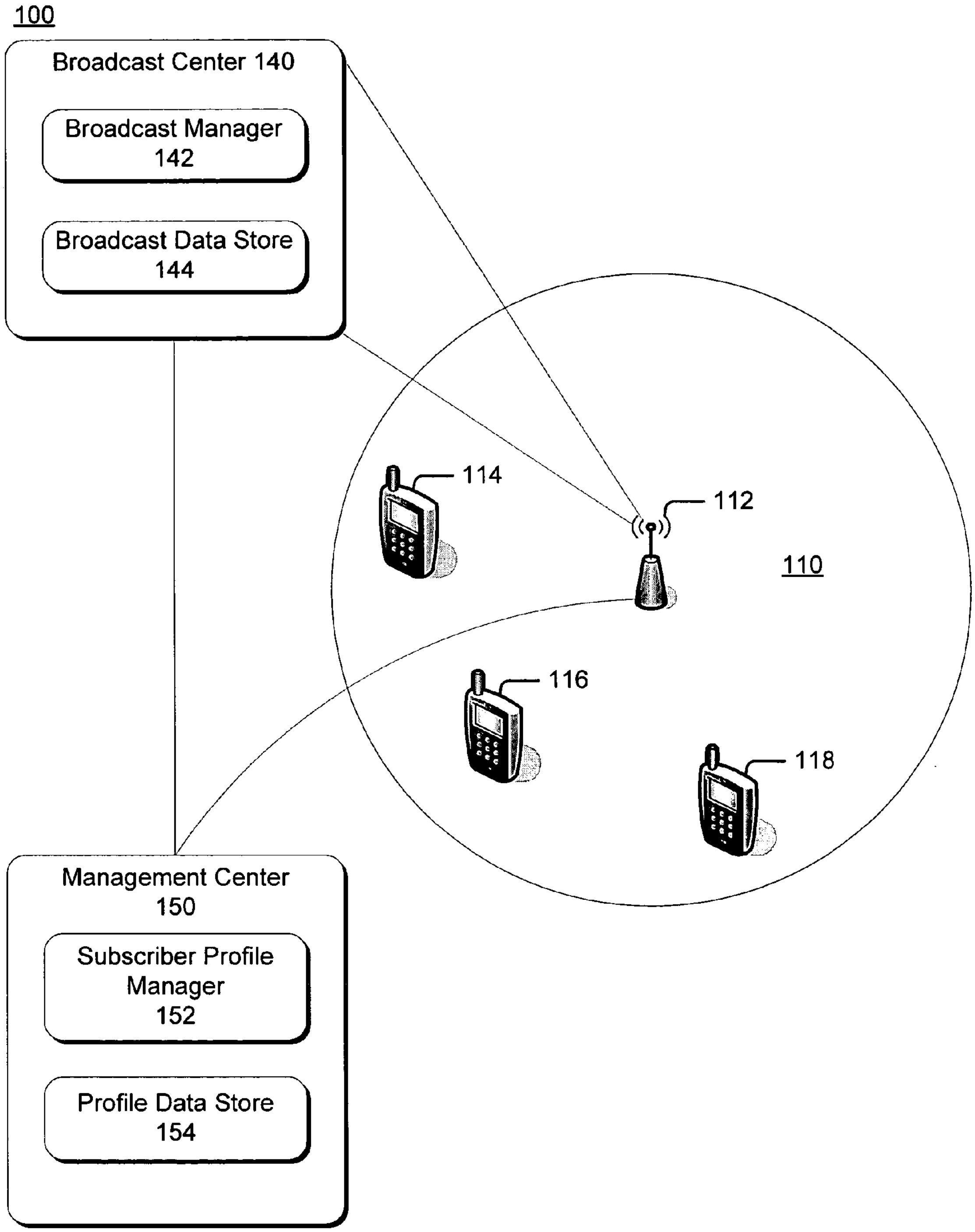
FIG. 1 is a schematic illustration of an exemplary implementation of a data broadcasting network.

FIG. 1 is a schematic illustration of an exemplary implementation of a data broadcasting environment 100 in which the subject matter described herein may be implemented. It will be appreciated that the environment 100 depicted in FIG. 1 is merely an exemplary environment and is not intended to suggest any limitation as to particular uses or functionality. The subject matter described herein may be implemented in a wide variety of data distribution environments including, but not limited to, radio, television, and satellite networks, digital radio systems, broadcast disk systems, publish/subscribe systems, Internet-based broadcasting systems, and the like.

Referring to FIG. 1, the environment 100 includes at least a head end 112 that broadcasts data throughout a broadcast region 110 to one or more subscriber units 114 that subscribe to a data broadcasting service transmitted from head end 112. As used herein, the term broadcast and its derivatives should be construed broadly to encompass any form of modulating, coding, and/or transmitting of a communication signal across a communication medium, wired or wireless. Similarly, as used herein, the term "subscribe" should be construed broadly to encompass any form of receiving, demodulating, and/or decoding of data broadcast head end 112.

In the implementation depicted in FIG. 1 the broadcast environment 100 includes a single broadcast region 110 which includes a head end 112, which broadcasts data throughout its broadcast region. Although FIG. 1 illustrates three a single head end 112 defining a single broadcast region 110, it will be appreciated that the specific number of regions is not important, and may vary depending upon, e.g., the geographic size of the operating environment, transmission power constraints, and interference and/or obstructions of the signal(s) broadcast from the head end 112. Also, it will be appreciated that there need not be a one-to-one correspondence between head ends and broadcast regions.

Head end 112 further includes infrastructure necessary for broadcasting a data signal. In a wireless communication environment such infrastructure may include equipment for encoding, modulating, and transmitting or transceiving a radio frequency (RF) signal at a specific frequency (or frequencies), or in accordance with a specific multi-frequency protocol. Such equipment is readily commercially available, and is known to those skilled in the art. The particular encoding, modulating, and/or transmission scheme is not important.

The broadcast environment 100 further includes a plurality of subscriber units 114, 116, 118, which may be embodied as wireless communication devices such as, e.g., personal computers (PCs), laptop computers, personal digital assistants (PDAs), mobile phones, or the like.

In an exemplary implementation the head end 112 may be assigned a unique identifier within broadcast environment 100. A head end 112 may be identified by a network address, station name, a carrier frequency, or other distinct designation. A data broadcast from a head end 112 to a subscriber unit 114, 116, 118 takes place over a communication channel. In an exemplary implementation the communication channel(s) may be defined by modulating a carrier wave in accordance with any conventional RF broadcasting technique such as, e.g., TDMA, FDMA, CDMA, or the like. The transmitted content may include various forms of data including, e.g., text, audio, video, and may also include control signals including, e.g., timing signals, power signals, location signals, etc. Control signals may be broadcast in-band, or on a separate control channel. In alternate embodiments the communication channel may comprise an uplink channel that may be implemented over a wired network such as, e.g., the internet, or a wireless network, or combinations thereof.

Broadcast environment 100 further includes a broadcast center 140 for managing the broadcast operations of head ends 112 and a management center 150 for managing subscriber profile information and other network management information. Broadcast center 140 includes a broadcast manager 142 and a broadcast data store 144. Management center 150 includes a subscriber profile manager 152 and a subscriber data profile 154. Broadly, the broadcast center 140 cooperates with the management center 150 to manage subscriber information, network information, and data broadcasting from one or more of the respective head ends 112 of the operating environment 100.

In one exemplary implementation broadcast center 140 and management center 150 may reside on a single computing device such as, e.g., a server computer associated with broadcasting environment 100. In alternate implementations the responsibility for broadcast management and subscriber profile management may be distributed between the head ends and the management center 150 in a different manner, or may be consolidated in either the management center 150 or the head ends 112. For example, the environment 100 may include a single management center 150, but the head end 112 may include a broadcast center 140.

In an exemplary implementation the head end 112 cooperates with the management center 150 to implement a data broadcast network that may cover a geographic region ranging in size from a region as small as a specific building or a corporate or academic campus to a region as large an entire country or continent. Broadly, the head end 112 cooperates with the management center 150 to manage subscriber information, network information, and data broadcasting. Communication sessions between the subscriber units 114, 116 and the management center 150 may be initiated over the wireless link on an ad-hoc basis or in a structured fashion such as, e.g., during a synchronization procedure.

Figure 2:
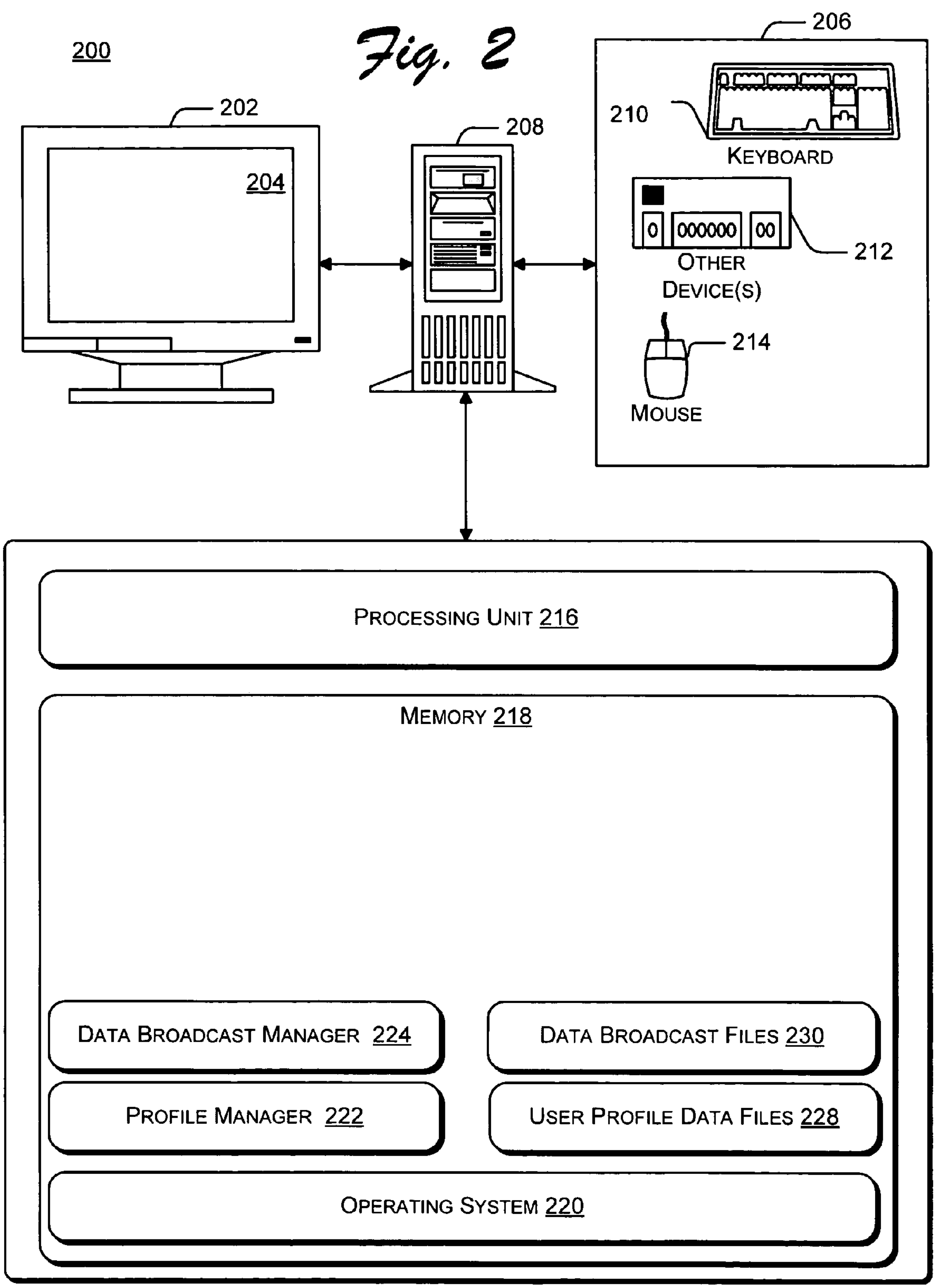
FIG. 2 is a schematic depiction of an exemplary system for intelligent data broadcasting.

FIG. 2 is a schematic illustration of an exemplary computer system 200 adapted to include a broadcast center 140 and a management center 150. This computer system 200 includes a display 202 having a screen 204, one or more user-input devices 206, and a computer 208. The user-input devices 206 can include any device allowing a computer to receive a developer's input, such as a keyboard 210, other device(s) 212, and a mouse 214. The other device(s) 212 can include a touch screen, a voice-activated input device, a track ball, and any other device that allows the system 200 to receive input from a developer. The computer 208 includes a processing unit 216 and random access memory and/or read-only memory 218.

Memory 218 includes an operating system 220 for managing operations of computer 208. In an exemplary implementation one or more application programs executable on the processing unit 216 reside in memory 218, including a profile manager 222 and a broadcast manager 224. Memory 218 further includes one or more data files including user profile data files 228 and data broadcast files 230. Operation of the system 200 is explained in greater detail below.

FIG. 3 is an illustration of an exemplary data structure for subscriber profile information. In an exemplary implementation a subscriber to the data broadcasting system maintains a subscriber profile including a subscriber identity and specifying particular categories of information of interest to the subscriber. This information may be stored in a suitable memory location such as, e.g., the user profile data files 228 stored in the memory 218 of computer 208. The file may be embodied as, e.g., a relational database. In an exemplary implementation the subscriber profile information may also be stored in the memory 318 of the data broadcasting subscriber unit, e.g., in the user profile data files 328.

Referring to FIG. 3, the subscriber profile information data structure includes a subscriber ID data field 300 and one or more categories of information of interest. In the exemplary data structure illustrated in FIG. 3, the categories of interest include sports 310, finance 320, business 330, and entertainment 340. Each category may include sub-categories specifying in further detail information of interest to the subscriber identified by subscriber ID 300. In the exemplary implementation illustrated in FIG. 3 the sports category 300 includes a soccer sub-category 312 and a baseball sub-category 314. The finance category 320 includes a stock quotes sub-category 322 and a mortgage rates sub-category 324. The business category 330 includes a weekly update sub-category 332, and the entertainment category includes a new hits sub-category 342 and a fallen stars sub-category 344. It will be appreciated that the data structure depicted in FIG. 3 may be expanded to include additional layers of sub-categories further detailing information of interest to a subscriber. By way of example, the soccer sub-category 312 may be expanded to include information about one or more specific teams or the stock quotes category 342 may be expanded to include information about one or more specific stocks. It will be appreciated that the subscriber profile information data structure may include other specific personal information or links to other specific personal information such as, e.g., electronic mail, electronic calendars, etc.

In an alternate implementation comprising multiple broadcast regions the subscriber profiles may be specific to the respective broadcast region in which the subscriber device is operating. By way of example, a subscriber may be interested in a particular set of information when the subscriber is in broadcast region 110 and a different set of information when the subscriber is in a different broadcast region. In such an implementation the subscriber profile may be modified to include a data broadcast region indicator and corresponding data of interest for the particular broadcast region(s).

FIG. 4 is an illustration of a data structure representing a data broadcasting schedule 400 for data broadcasting system 100. The data broadcasting schedule 400 may be stored in the broadcast data store 144, e.g., as one of the broadcast data files 230 stored in the memory 218 of computer 208. In an exemplary implementation the data broadcasting schedule 400 may be represented in tabular format as a series of documents 410 for broadcast, each of which is identified by a content identifier 420 that describes the content of the document. The broadcast schedule 400 further includes a broadcast periodicity 530 associated with the document that defines the periodicity with which the document is broadcast. The broadcast schedule further includes a start time 440 and a stop time 450 for each document. By way of illustration, the broadcast schedule depicted in FIG. 4 reflects that document number 1 in the broadcast schedule includes soccer information, and is broadcast every sixty minutes beginning at 06:00:00 and terminating at 06:05:00.

In an exemplary implementation the data broadcast manager 224 maintains the data broadcast schedule 400. The data broadcast manager 224 may include a user interface that permits a user to add documents to or delete documents from the data broadcast schedule 400, and/or to modify the periodicity with which documents are broadcast. The broadcast duration is a function of the amount of data to be broadcast and the bandwidth available to the data broadcasting system 100. When a scheduled broadcast is complete the broadcast manager 224 may update the start time 440 and stop time 450 to reflect the next broadcast of the document.

The data broadcast files 230 may also include the content to be broadcast. By way of example, the soccer document may include scores and other information about soccer teams, the stock quotes may document may include current quotes for particular stocks. This information may be updated periodically by the data broadcast manager 224 or by another application program executing on the processing unit 216 of computer 208. When the scheduled broadcast time for a document arrives, the broadcast manager retrieves the document from the data broadcast files 230 and broadcast the document over from one or more head ends 112 in the system 100. In this regard, it will be appreciated that the broadcast schedule may be specific to a head end 112, such that the broadcast schedule is unique to a broadcast region 110.

Referring again to FIG. 3, in an exemplary implementation entries in the subscriber profile may also include a data field that identifies the document stored in the memory of the device. In one implementation the entry may include a time stamp such as time stamp 316 or 318 that identifies a time at which the document was downloaded. In another implementation the entry may include a version number such as version number 326, 328, 346, and 348 that uniquely identifies the version of the document stored in the user's device. In yet another implementation the entry may include a date stamp that identifies the date of the document stored in the user's device.

The particular transmission medium by which the documents are transmitted to the subscriber units is not important. In one implementation documents are transmitted to the subscriber unit over a wireless communication channel between a head end 112 and a subscriber unit 114, 116, 118. In another implementation documents may also be transmitted to the subscriber unit over a wired connection, e.g., such as a data network, when a subscriber unit is positioned in its cradle for charging. When the documents are received by the subscriber units 114, 116, 118, the subscriber units transmit a confirmation message back to the management center 150. The confirmation message includes information identifying the version of the document stored in the memory of the subscriber unit 114, 116, 118. This version information may be stored in the subscriber profile 300.

Exemplary Operations

In an exemplary implementation, the broadcast manager(s) 224 cooperate with the profile manager(s) 222 to manage the data broadcast in an intelligent manner which reflects the aggregate version information of documents for the subscribers in the broadcast region.

Figure 5:
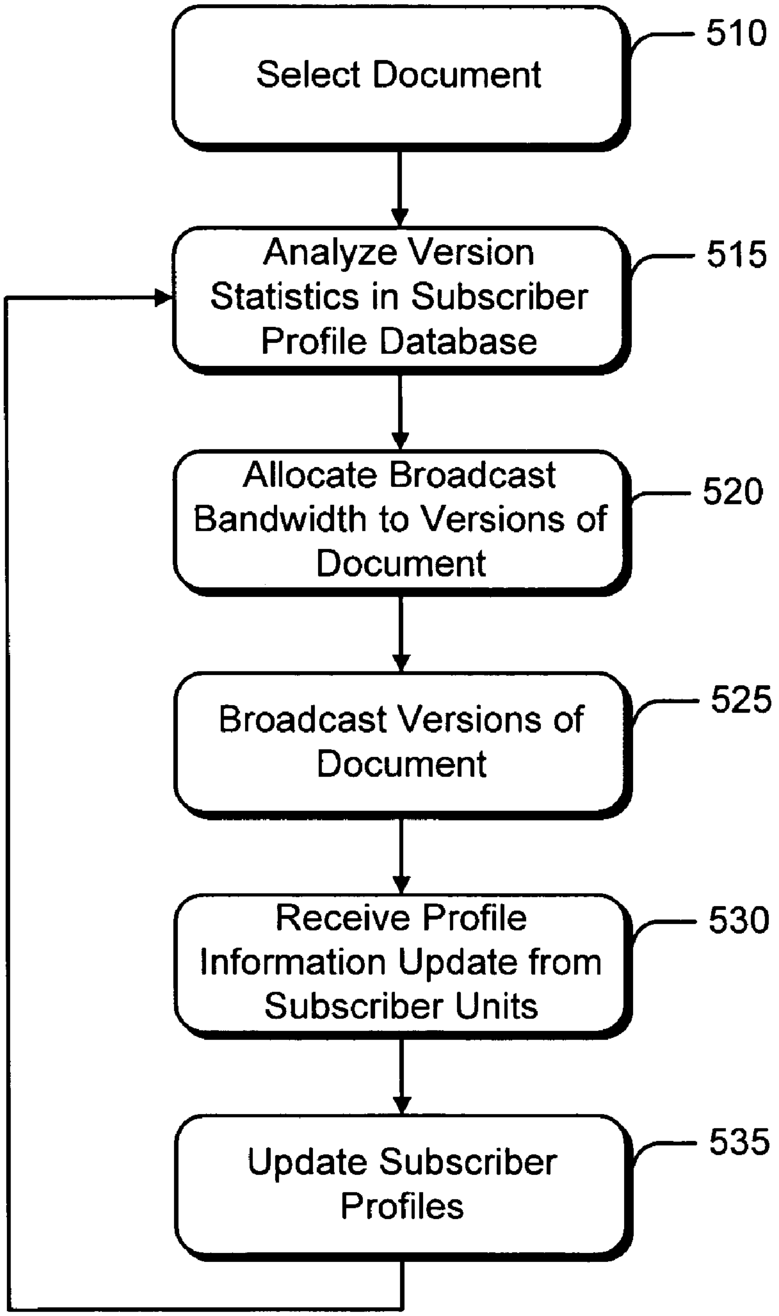
FIG. 5 is a flowchart illustrating operations in an exemplary method for performing differential updates in data broadcasting.

FIG. 5 is a flowchart illustrating operations in an exemplary method for intelligent data broadcasting. In an exemplary implementation the operations of FIG. 5 may be implemented by the data broadcast manager 224 of computer 208. In alternate implementations certain of the operations may be performed by the profile manager module 222 of computer 208. As described above, the broadcast manager and the profile manager may be centrally located in a single computer. Alternately, each head end 112 may maintain an independent broadcast manager and/or profile manager, which may communicate as necessary to implement intelligent broadcast operations.

Referring to FIG. 5, at operation 510 the broadcast manager 224 selects a document, e.g., from the broadcast schedule 400, for analysis. At operation 515 the broadcast manager analyzes version statistics in the subscriber profile database for the document. In an exemplary implementation the analysis involves retrieving from the subscriber profile version information from each subscriber profile such as profile 300 in the subscriber profile database and creating a histogram representing the number of subscriber units that possess specific versions of a document.

At operation 520, broadcast bandwidth is allocated to the versions of the document. In an exemplary implementation broadcast bandwidth for each version of the document may be allocated in proportion to the number of subscriber units who require the differential information in a version to bring the version of the document stored on the subscriber unit up to date.

By way of example, and referring to FIG. 4, document number 4 may include a large amount of business data compiled during the course of the previous week, and which is updated on a periodic basis. If ninety percent of the subscriber units in a broadcast region have stored in their respective memory modules a version of the document that is twenty-four hours old, and only ten percent of the subscriber units have stored in their respective memory modules a version of the document that is a week old, then broadcast bandwidth for the document may be allocated in a manner that updates ninety percent of the users first. The broadcast manager can queue for broadcasting a document that represents the incremental information required to update the ninety percent of subscriber units. The full document may be allocated relatively less broadcast bandwidth. At operation 525 the document is broadcast.

When a subscriber unit receives the document, the subscriber unit can optionally execute a routine to determine whether the document should be committed to memory. In an exemplary implementation the document may include an identifier that includes information that permits the subscriber unit to make this determination. By way of example, the document may include a version number, and the subscriber unit may commit the document to memory only if the version number of the received document corresponds to a predetermined version numbering scheme. If the subscriber unit commits the document to memory, then the subscriber unit may transmit a confirmation message to the subscriber profile manager 152 indicating that the document has been committed to memory. The subscriber profile manager 152 may receive the profile information update from subscriber units (operation 530) and then update the subscriber profile associate with the subscriber unit to reflect receipt of the document (operation 535). Control may then pass back to operation 515, and the broadcast manager can continue processing other documents in the queue.

By repeating the process illustrated in FIG. 5, the broadcast manager can allocate the broadcast bandwidth between various versions of documents in the broadcast carousel in a manner that uses the bandwidth to efficiently update subscriber units that have the document in their respective profiles. It will be appreciated that the process can be repeated for all documents in the broadcast carousel to allocate the broadcast bandwidth. Further, it will be appreciated that the subscriber modules may obtain content from sources other than the data broadcast such as, e.g., wired networks, magnetic or optical media, etc.

Exemplary Computing Device

Figure 6:
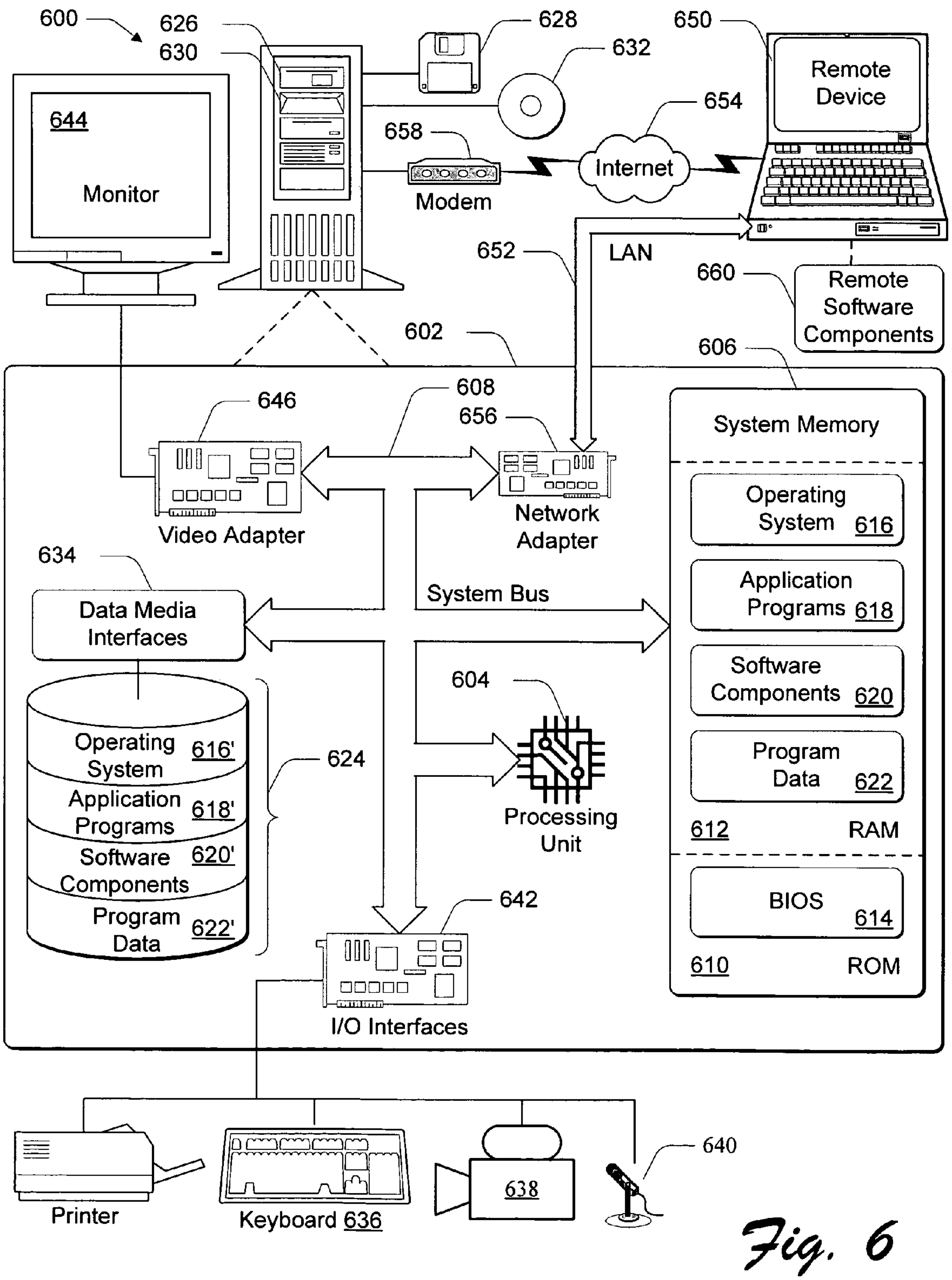
FIG. 6 is a schematic illustration of an exemplary computing device.

The various components and functionality described herein may be implemented with a number of individual computers. FIG. 6 shows components of typical example of such a computer, referred by to reference numeral 600. The components shown in FIG. 6 are only examples, and are not intended to suggest any limitation as to the scope of the functionality of the invention; the invention is not necessarily dependent on the features shown in FIG. 6.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 6, the components of computer 600 may include, but are not limited to, a processing unit 604, a system memory 606, and a system bus 608 that couples various system components including the system memory to the processing unit 604. The system bus 608 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 600 typically includes a variety of computer-readable media. Computer-readable media can be any available media that can be accessed by computer 600 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 600. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 606 includes computer storage media in the form of volatile and/or nonvolatile memory such as read only memory (ROM) 610 and random access memory (RAM) 612. A basic input/output system 614 (BIOS), containing the basic routines that help to transfer information between elements within computer 600, such as during start-up, is typically stored in ROM 610. RAM 612 typically contains data and/or program modules that are immediately accessible to and/or presently being operated on by processing unit 604. By way of example, and not limitation, FIG. 6 illustrates operating system 616, application programs 618, other program modules 620, and program data 622.

The computer 600 may also include other removable/non-removable, volatile/nonvolatile computer storage media. By way of example only, FIG. 6 illustrates a hard disk drive 624 that reads from or writes to non-removable, nonvolatile magnetic media, a magnetic disk drive 626 that reads from or writes to a removable, nonvolatile magnetic disk 628, and an optical disk drive 630 that reads from or writes to a removable, nonvolatile optical disk 632 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 624 is typically connected to the system bus 608 through a non-removable memory interface such as data media interface 634, and magnetic disk drive 626 and optical disk drive 630 are typically connected to the system bus 608 by a removable memory interface.

The drives and their associated computer storage media discussed above and illustrated in FIG. 6 provide storage of computer-readable instructions, data structures, program modules, and other data for computer 600. In FIG. 6, for example, hard disk drive 624 is illustrated as storing operating system 616', application programs 618', other program modules 620', and program data 622'. Note that these components can either be the same as or different from operating system 616, application programs 618, other program modules 620, and program data 622. Operating system 616, application programs 618, other program modules 620, and program data 622 are given different numbers here to illustrate that, at a minimum, they are different copies. A user may enter commands and information into the computer 600 through input devices such as a keyboard 636, a mouse, trackball, or touch pad. Other input devices (not shown) may include a microphone, joystick, game pad, satellite dish, scanner, or the like. These and other input devices are often connected to the processing unit 604 through an input/output (I/O) interface 642 that is coupled to the system bus, but may be connected by other interface and bus structures, such as a parallel port, game port, or a universal serial bus (USB). A monitor 644 or other type of display device is also connected to the system bus 608 via an interface, such as a video adapter 646. In addition to the monitor 644, computers may also include other peripheral output devices (e.g., speakers) and one or more printers, which may be connected through the I/O interface 642.

The computer may operate in a networked environment using logical connections to one or more remote computers, such as a remote computing device 650. The remote computing device 650 may be a personal computer, a server, a router, a network PC, a peer device or other common network node, and typically includes many or all of the elements described above relative to computer 600. The logical connections depicted in FIG. 6 include a local area network (LAN) 652 and a wide area network (WAN) 654. Although the WAN 654 shown in FIG. 6 is the Internet, the WAN 654 may also include other networks. Such networking environments are commonplace in offices, enterprise-wide computer networks, intranets, and the like.

When used in a LAN networking environment, the computer 600 is connected to the LAN 652 through a network interface or adapter 656. When used in a WAN networking environment, the computer 600 typically includes a modem 658 or other means for establishing communications over the Internet 654. The modem 658, which may be internal or external, may be connected to the system bus 608 via the I/O interface 642, or other appropriate mechanism. In a networked environment, program modules depicted relative to the computer 600, or portions thereof, may be stored in the remote computing device 650. By way of example, and not limitation, FIG. 6 illustrates remote application programs 660 as residing on remote computing device 650. It will be appreciated that the network connections shown are exemplary and other means of establishing a communications link between the computers may be used.

CONCLUSION

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A method of managing a data broadcast, comprising:

storing, for each of a plurality of subscriber units, on a computer storage device associated with a server an indication of a most up to date version of a document acknowledged as stored by the subscriber unit;

determining, at the server, for each of a plurality of versions of the document, a population number of the plurality of subscriber units for which the version of the document and the indication of the most up to data version of the document for the subscriber unit are the same;

receiving, at the server in a data broadcasting system serving the plurality of subscriber units, information identifying a first version of the document resident in a memory module of a first subscriber unit of the plurality of subscriber units;

adjusting, at the server, the population numbers of the plurality of subscriber units for which the version of the document and the indication of the most up to data version of the document for the subscriber unit are the same in accordance with the received information;

determining, at the server, for each of the plurality of versions for which the population number is greater than zero, a set of differential information, the set of differential information being associated with updating the version to a current version;

allocating broadcast bandwidth for each of the sets of differential information, wherein each set of differential information is allocated a number of different broadcast bandwidth times in a broadcasting schedule in proportion to the population number of the version associated with the set of differential information; and broadcasting each of the sets of differential information in accordance with the broadcasting schedule.

2. The method of claim 1, wherein receiving information identifying the first version of the document resident in the memory module of the first subscriber unit comprises receiving a signal on a communication control channel established between a first data broadcasting unit of the data broadcasting system and the first subscriber unit.

3. The method of claim 2, further comprising storing information identifying the first version of the document in a memory location logically associated with the first subscriber unit.

4. The method of claim 3, wherein receiving, at the server in a data broadcasting system, information identifying the first version of the document resident in the memory module of the first subscriber unit comprises:

receiving a signal from the first subscriber unit indicating that a synchronization process is complete.

5. The method of claim 1, wherein adjusting the population numbers comprises obtaining profile information associated with the first subscriber unit.

6. The method of claim 5, wherein obtaining profile information associated with the first subscriber unit comprises retrieving profile information from a data store.

7. The method of claim 1, wherein allocating broadcast bandwidth comprises adjusting a rate of recurrence of a specific version of a document.

8. A method of managing a data broadcast, comprising:

establishing an initial broadcast schedule for each document in a data broadcast region;

monitoring profile information for a plurality of subscriber units in the data broadcast region, the profile information indicating a first set of differential information a subscriber unit requires for the subscriber unit to have an up to date version of a document; and adjusting the initial broadcast schedule in the specific region of the data broadcasting system, wherein adjusting the initial broadcast schedule produces a new broadcast schedule, wherein each of a plurality of sets of differential information are allocated a number of broadcast times in the new broadcast schedule in proportion to a number of subscriber units that require the set of differential information in accordance with the profile information, wherein establishing, monitoring and adjusting are performed by a processor.

9. The method of claim 8, wherein monitoring profile information for a plurality of subscriber units in the data broadcast region comprises determining document version information for a subscriber unit in the data broadcast region.

10. The method of claim 9, wherein determining document version information that locates a subscriber unit in the data broadcasting region comprises retrieving document version information from a subscriber profile database.

11. The method of claim 8, wherein monitoring profile information for a plurality of subscriber units in the data broadcast region comprises monitoring changes to profile information associated with the plurality of subscriber units.

12. A computer program product comprising logic instructions embodied on a computer storage media which, when executed by a processor, configure the processor to:

store, for each of a plurality of subscriber units, an indication of a most up to date version of a document acknowledged as stored by the subscriber unit;

determine, for each of a plurality of versions of the document, a population number of the plurality of subscriber units for which the version of the document and the indication of the most up to data version of the document for the subscriber unit are the same;

receive, at a server in a data broadcasting system serving at least two subscriber units, information identifying a first version of a document resident in a memory module of a first subscriber unit of the plurality of subscriber units;

adjust the population numbers of the plurality of subscriber units for which the version of the document and the indication of the most up to data version of the document for the subscriber unit are the same in accordance with the received information;

determine, for each of the plurality of versions for which the population number is greater than zero, a set of differential information, the set of differential information being associated with updating the version to a current version;

allocate broadcast bandwidth for each of the sets of differential information, wherein each set of differential information is allocated a number of different broadcast bandwidth times in a broadcasting schedule in proportion to the population number of the version associated with the set of differential information; and broadcast each of the sets of differential information in accordance with the broadcasting schedule.

13. The computer program product of claim 12, further comprising logic instructions which, when executed, configure the processor to obtain profile information associated with the first subscriber unit.

14. The computer program product of claim 12, further comprising logic instructions which, when executed, configure the processor to retrieve profile information from a data store.

15. The computer program product of claim 12, further comprising logic instructions which, when executed, configure the processor to adjust a rate of recurrence of a specific document version.

16. A computer program product comprising logic instructions embodied on a computer storage media which, when executed by a processor, configure the processor to:

establish an initial broadcast recurrence rate for one or more documents in a data broadcast region;

monitor profile information for a plurality of subscriber units in the data broadcast region, the profile information indicating a first set of differential information a subscriber unit requires for the subscriber unit to have an up to date version of a document; and adjust the initial broadcast schedule in the specific region of the data broadcasting system, wherein adjusting the initial broadcast schedule produces a new broadcast schedule, wherein each of a plurality of sets of differential information are allocated a number of broadcast times in the new broadcast schedule in proportion to a number of subscriber units that require the set of differential information in accordance with the profile information.

17. The computer program product of claim 16, further comprising logic instructions which, when executed by a processor, configure the processor to obtain profile information associated with at least one subscriber unit.

18. The computer program product of claim 16, further comprising logic instructions which, when executed by a processor, configure the processor to compile version information for a plurality of documents in a subscriber profile information database.

19. The computer program product of claim 16, further comprising logic instructions which, when executed by a processor, configure the processor to monitor changes to profile information associated with the plurality of subscriber units.

* * * * *